Nov. 4, 1958  S. G. REYNOLDS  2,858,770
DUAL CHAMBERED FLUID POWER DEVICE
Filed Feb. 29, 1956  2 Sheets-Sheet 1
Fig. 1
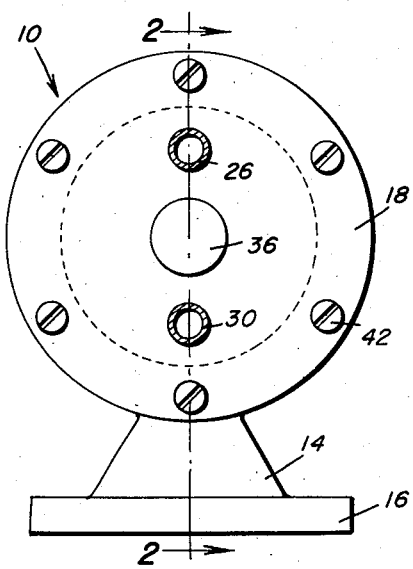
Fig. 6
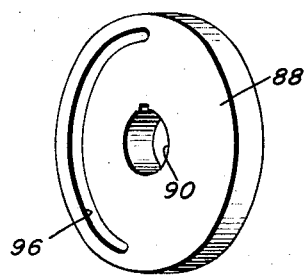
Fig. 4
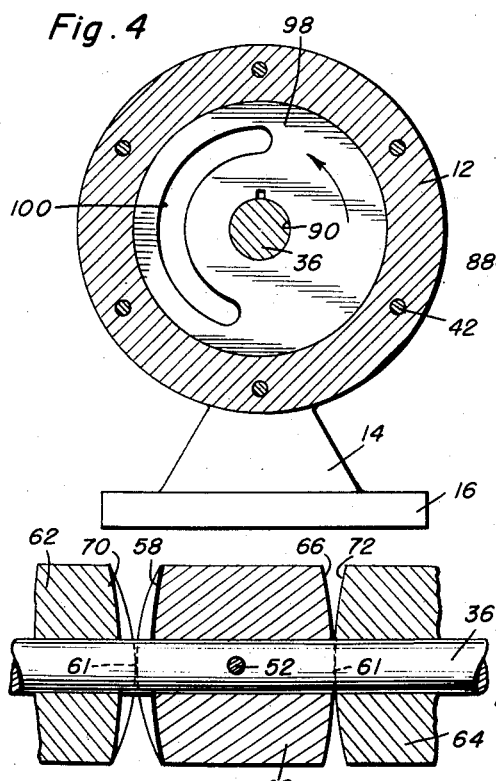
Fig. 5
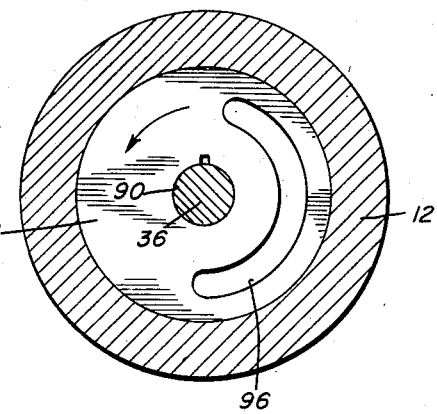
Fig. 7
Stephen G. Reynolds
INVENTOR.

Nov. 4, 1958 S. G. REYNOLDS 2,858,770
DUAL CHAMBERED FLUID POWER DEVICE
Filed Feb. 29, 1956 2 Sheets-Sheet 2
Fig. 2
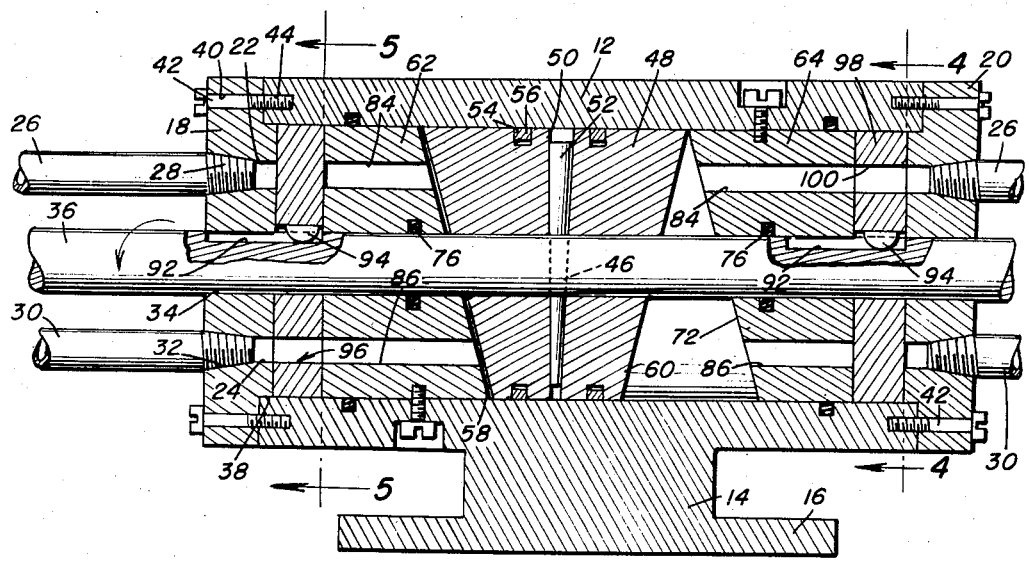
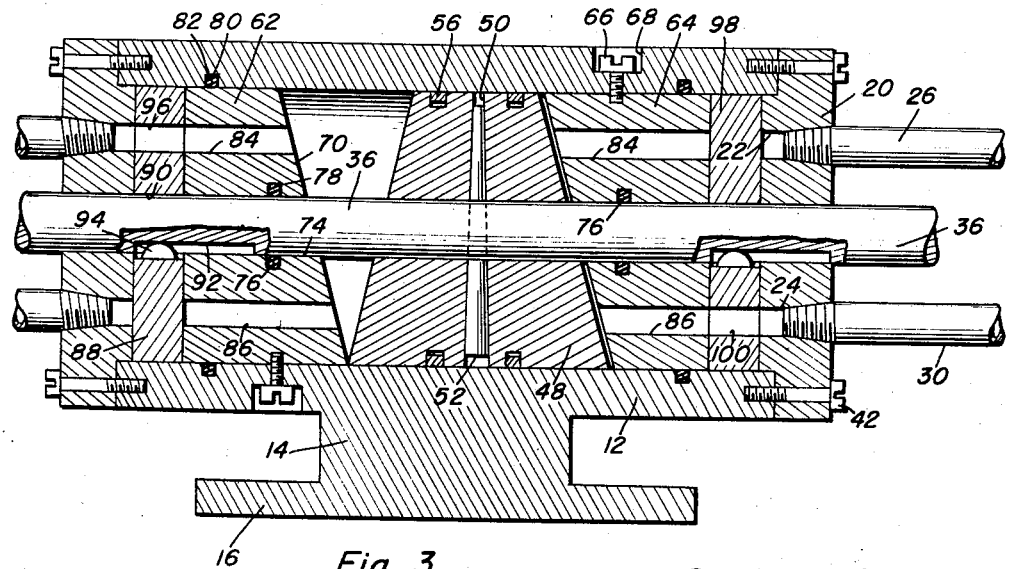
Fig. 3
Stephen G. Reynolds
INVENTOR.

United States Patent Office 2,858,770
Patented Nov. 4, 1958

2,858,770

DUAL CHAMBERED FLUID POWER DEVICE

Stephen G. Reynolds, Terre Haute, Ind., assignor of fifty percent to Tolbert C. Bushong, Waveland, Ind.

Application February 29, 1956, Serial No. 568,590

7 Claims. (Cl. 103—157)

This invention generally relates to a fluid power device and more specifically provides a fluid motor or pump having a multiplicity of working chambers and basically includes a cylindrical housing with a rotor mounted therein together with novel inclined working surfaces within the working chamber together with a novel valve arrangement which is positive and mechanical in operation for proper admission and discharge of fluid for the purposes intended.

An object of the present invention is to provide a fluid power device which may be employed either as a fluid motor or as a pump and includes a valving arrangement wherein fluids at relatively high pressures may be employed for increasing the effectiveness of the device.

A further object of the present invention is to provide a fluid power device including a stationary cylindrical housing with a rotatable and longitudinally movable rotor disposed therein together with a novel arrangement of ports and valves whereby the device may be employed as a practical and efficient fluid motor or pump.

Other objects of the present invention will reside in its simplicity of construction, ease of operation, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end elevational view of the fluid power device of the present invention;

Figure 2 is a longitudinal, vertical sectional view taken substantially upon a plane passing along section line 2—2 of Figure 1 illustrating the relationship of the various elements of the housing and the rotor with the rotor being in one position;

Figure 3 is a longitudinal, vertical sectional view similar to Figure 2 and showing the rotor at a position diametrically opposed to the position as illustrated in Figure 2 thereby illustrating the movement of the rotor during rotation thereof whereby a dual working chamber is provided with the opposite faces of the rotor providing one surface of each working chamber;

Figure 4 is a detailed transverse sectional view taken substantially upon a plane passing along section line 4—4 of Figure 2 illustrating the valving construction and the means of attaching the valve to the rotating shaft;

Figure 5 is a detailed sectional view taken substantially upon a plane passing along section line 5—5 of Figure 2 illustrating the details of the valve at the other end of the cylindrical housing and the relationship thereof to the ports;

Figure 6 is a perspective view of one of the disk valves per se; and

Figure 7 is a sectional view of the stators and rotor illustrating the curvature of the working surfaces.

Referring now specifically to the drawings, the numeral 10 generally designates the fluid power device of the present invention which includes a generally elongated cylindrical housing 12 having a depending laterally extending portion 14 terminating in a supporting base 16 which may be mounted on any suitable surface as desired.

One end of the housing 12 is closed with an end plate 18 and the other end of the housing 12 is closed with an end plate 20 each of which are provided with diametrically opposed ports 22 and 24 with the ports 22 being attached to an inlet tube 26 by a screw threaded connection 28 and the port 24 is attached or communicated with an exhaust tube 30 by threaded connection 32.

Centrally disposed in each of the end plates 18 and 20 is an aperture 34 rotatably and slidably receiving a central power shaft 36. Also, each of the end plates 18 and 20 is provided with a cylindrical projection 38 which telescopes within the end of the housing 12 thereby accurately positioning the end plates 18 and 20 in the ends of the housing 12.

Each of the end plates 18 and 20 are also provided with a plurality of circumferentially spaced apertures 40 receiving screw threaded fasteners 42 having the screw threaded end threaded into a screw threaded bore 44 in the end of the housing 12 thereby rigidly mounting the end plates 18 and 20 in position.

The central portion of the power shaft 36 is provided with a transverse bore 46 for retaining a rotor 48 thereon. The rotor 48 is provided with a transverse bore 50 and a tapered pin 52 is inserted in the tapered transverse bore 50 and 46 thereby rigidly mounting the rotor 48 on the power shaft 36. The rotor 48 is provided with a pair of longitudinally spaced peripheral grooves 54 receiving annular seal rings 56 therein for engagement with the inner surface of the housing 12 thereby sealing the rotor 48 to the housing 12 for rotational and sliding movement therein. The opposite surfaces of the cylindrical rotor 48 are inclined as designated by the numerals 58 and 60 with the surfaces 58 and 60 converging toward the same side of the rotor 48, whereby one side of the rotor 48 is relatively short in longitudinal length while the other side diametrically opposed thereto is relatively long in longitudinal length.

Disposed within the housing 12 is a pair of end stators 62 and 64 which are cylindrical in construction and rigidly retained within the housing 12 by screw threaded fasteners 66 having the heads thereof recessed into sockets 68. The inner surfaces of the stators 62 and 64 are inclined as designated by the numerals 70 and 72 with these surfaces 70 and 72 being in spaced parallel relation to each other with the rotor 48 being disposed therebetween. The central portion of the stators 62 and 64 are each provided with a longitudinal bore 74 for rotatably and slidably receiving the power shaft 36. An annular O-ring 76 is provided in an annular groove 78 in the bore 74 in each of stators 62 and 64 for sealing the power shaft 36 in relation to the stators 62. Also, an O-ring 80 is provided in an annular groove 82 in each end of the housing 12 for sealing the stators 62 and 64 in relation to the housing 12.

Each of the stators 62 and 64 is provided with a pair of diametrically opposed bores 84 and 86 which are in longitudinal alignment with the bores 22 and 24 respectively and the outer edges or surfaces of the stators 62 and 64 are in spaced parallel relation to the inner surfaces of the end plates 18 and 20.

Disposed between the end plate 18 and stator 62 is a rotatable valve plate or disk 88 having a central bore 90 slidably receiving the power shaft 36. The power shaft 36 is provided with a longitudinally elongated groove 92 receiving a semi-circular key 94 whereby the shaft 36 may slide through the valve plate 88 but will rotate the plate 88 therewith. The plate 88 is provided with an arcuately extending slot 96 for communicating the bore 22 with the bore 84 during a portion of its revolution and for communicating the bore 86 with the bore 24 during another part of its revolution thereby selectively admitting fluid into the bore 84 and discharging the fluid from bore 86.

The stator 64 is provided with a like arrangement of bores and a rotatable valve plate or disk 98 is disposed therein and secured to the shaft 36 in a similar manner as the valve plate 88. The valve plate 98 is provided with an arcuate slot 100 which is diametrically opposed to the slot 96 in valve plate 88 whereby the valve plate 98 will be exhausting fluid through the exhaust bore 24 by aligning the slot 100 with the bores 86 and 24 while the valve plate 88 is admitting fluid pressure through the aligned bores 22 and 84 and the slot 96.

For purposes of illustration, the fluid power device has only a dual working chamber but it will be understood that as many working chambers as desired may be provided for providing any number of power strokes or pumping strokes desired. It will be noted that the rotor 48 rotates from a position with the surface 58 adjacent to and parallel to the surface 70 as illustrated in Figure 2 to a position with the suprface 60 parallel to and adjacent the surface 72 in one-half of a revolution thereby alternately compressing and exhausting fluid in the working chambers as the rotor rotates the long longitudinal length of the rotor 48 which is substantially equal in length to the distance between the stators 62 and 64 thereby continuously contacting the surfaces 70 and 72 which will cause the rotor 48 to reciprocate and function as a pump when the shaft 36 is driven by an external source of power.

As specifically illustrated in Figure 7 of the official drawings, it will be noted that both surfaces 58 and 60 of the rotor and the inclined surfaces 70 and 72 of the stators are convexly curved with the high points 61 being diametrically disposed at the points on both the stators and rotor having the shortest and longest longitudinal space therebetween respectively thereby acting as cam surfaces when the device is employed as a motor. This curved construction will transmit longitudinal force exerted on one surface of the rotor, by admission of pressurized fluid between the rotor and adjacent stator, to rotational force on the shaft since the engaging curved cam surfaces of the stator and rotor will cause the rotor to rotate about its longitudinal axis as the pressurized fluid urges the rotor longitudinally due to the cam surface on the rotor moving down the incline of the cam surface on the stator.

When the device is operated as a motor, at least two rotors and associated stators must be employed to assure that the rotors will not be stopped at "dead center." This requires the rotors to be timed in staggered relation to each other to assure that the fluid pressure on one rotor will carry the high points of the other rotor past the high points on the other stator before pressure is admitted into contact with the opposite surface of said other rotor for moving the other rotor longitudinally for continuing rotation of power shaft 36. This construction permits the motor to be more efficiently operated and the convex curvature provides a gradual camming action. The rotor surfaces 58 and 60 and stator surfaces 70 and 72 are inclined as shown and are convexly curved to reduce bearing area between these surfaces with a subsequent reduction in friction. This construction provides a space between the facing surfaces 70 and 58, and 72 and 60 thereby facilitating distribution of hydraulic fluid throughout the surface areas and onto the cylinder walls for lubrication thereof. The pressure of the hydraulic fluid is maintained by the seal rings 56.

Continuous contact is maintained between the rotor (rotors) and stator cam surfaces at some point throughout the movement of the rotor (piston) in opposition to the stator cam surfaces when employed as a pump, or throughout the movement of the stators in opposition to the static rotor (piston) when the device is employed as a motor. The cam action of the opposing rotor and stator surfaces thus cause the rotor shaft to move back and forth in a longitudinal direction to alternately provide a fluid chamber and to exhaust such chamber in synchronization with the inlet and exhaust valves.

The angle of opposing planes of rotor and stators may be varied to govern capacity of fluid chambers in relation to the requirements of the type of work to be performed by the pump or motor.

The main purpose and advantage of this device, as contemplated is for the transmission of power impulses by coordination of one such device, acting as a pump, and a similar device operating as a motor. It is apparent, and demonstrated by long experiment with working prototypes, that the transmission of pressure through a column of fluid from pump exhaust to motor inlet is accomplished without the necessity for volumetric transfer of fluid as would be required to operate a conventional vane type of hydraulic motor. Reduction in volume of fluid flow similarly reduces the speed of flow with consequent friction, heat, and possible crystallization or breakdown of the hydraulic fluid. As previously indicated, when utilized as a motor the device would incorporate a multiplicity of rotors and stators to eliminate the possibility of a dead-center stop and consequent difficulty in restarting the motor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fluid power device comprising a cylindrical housing, end plates forming closures for said housing, a power shaft extending longitudinally through said housing and rotatably and slidably journaled in said end plates, a central cylindrical rotor mounted rigidly on said shaft, a stator disposed adjacent each end of the rotor and adjacent each end plate, each of said stators and end plates having aligned inlet and outlet bores disposed diametrically opposite each other, said rotor having inclined laterally converging surfaces, said stators having inner inclined surfaces disposed in spaced and substantially parallel relation with the long length of the rotor being generally equal to the distance between the stators, and a disk valve disposed between each stator and an adjacent end plate, each of said valves having an arcuate slot for selective alignment with the inlet and outlet bores in the end plates and stators for admitting and discharging fluid between the inclined surface on the stator and adjacent surface on the rotor, rotation of the shaft causing axial movement of the rotor and shaft in relation to the stators and housing, said rotor having the inclined surface thereon selectively positioned in diverging relation to the surface on the stator and in parallel adjacent relation at diametric points of rotation for varying the volume of the space between the rotor and stator.

2. The combination of claim 1 wherein said disk valves are slidably keyed to said power shaft to permit sliding movement of the rotor and power shaft to permit alternating fluid intake and exhaust into the space between the rotor and stators.

3. The combination of claim 1 wherein said rotor and power shaft have a transverse tapered bore therein, and a tapered pin disposed in said bore for locking the rotor to the shaft.

4. The combination of claim 1 wherein said rotor is provided with a pair of peripheral grooves, and a sealing ring in each groove for sealing engagement with the housing during rotation and axial reciprocation of said rotor with the shaft.

5. The combination of claim 1 wherein each of said inclined surfaces on the stators and rotors have a convexly curved configuration with diametrically opposed high points thereby forming cam surfaces for converting longitudinal force exerted on the rotor by pressurized fluid admitted between adjacent surfaces of the rotor and one stator to rotational movement of the rotor and shaft as the curved surface of the rotor moves down the inclined curved surface of the stator as the rotor moves longitudinally toward the stator thereby forming a motor and exhausting fluid from the space therebetween.

6. A pump comprising a housing having a cylindrical bore therein, a stator mounted in each end of the bore and forming a closure therefor with the stators being longitudinally spaced, each of said stators having an inlet and an outlet opening, valve means selectively communicating the inlet opening with a source of fluid and communicating the outlet opening with a discharge for admitting and discharging fluid in relation to the space between the stators, a power shaft extending through said stators, said shaft being slidably and rotatably supported in said stators, a cylindrical rotor rigid with said shaft and having end surfaces disposed in transversely converging inclined planes, each of said stators having an inner surface disposed in an inclined plane, the planes of the inner surfaces of the stators being substantially parallel and spaced apart a distance substantially equal to the longest length of the rotor whereby the end edges of the rotor at the point of longest longitudinal length will continuously engage the inner surfaces of the stators throughout the revolution of the rotor thereby causing axial reciprocation of the rotor due to the generally parallel inclined planes of the inner surfaces of the stators whereby the area between the converging surfaces of the rotor and the parallel surfaces of the stators will alternately increase and decrease in volume, said communicating means for the inlet and outlet openings being operative in response to rotation of the rotor for permitting inlet of fluid only through the inlet opening during increase in volume of said area and permitting discharge of fluid only from the outlet opening during decrease in the volume of said area thereby forming a pump for the fluid.

7. The combination of claim 6 wherein the facing surfaces of the rotor and stators are transversely and convexly curved with the high points of the curved surfaces being diametrically disposed at the points of longest and shortest longitudinal length respectively of the rotor and stators thereby reducing the area of bearing contact between the surfaces thereby reducing friction and permitting circulation of the fluid between the surfaces for lubrication of the cylindrical bore.

References Cited in the file of this patent

UNITED STATES PATENTS

| | | |
|---|---|---|
| 15,173 | Carpenter | June 24, 1856 |
| 1,404,625 | Marquet | Jan. 24, 1922 |
| 1,451,723 | Vollmann | Apr. 17, 1923 |
| 1,460,988 | Thompson | July 3, 1923 |
| 1,833,501 | Schick | Nov. 24, 1931 |
| 1,904,373 | Kempthorne | Apr. 18, 1933 |
| 1,904,374 | Kempthorne | Apr. 18, 1933 |
| 1,936,467 | Deubel | Nov. 21, 1933 |
| 2,043,544 | Kempthorne | June 9, 1936 |
| 2,152,498 | Quiroz | Mar. 28, 1939 |
| 2,154,457 | Knapp | Apr. 18, 1939 |
| 2,301,667 | Lutz | Nov. 10, 1942 |
| 2,316,107 | Ruben | Apr. 6, 1943 |
| 2,377,886 | Jastrzebski | June 12, 1945 |
| 2,517,862 | Frederick | Aug. 8, 1950 |
| 2,646,753 | Zoll | July 28, 1953 |
| 2,672,099 | Deubel | Mar. 16, 1954 |
| 2,681,046 | Barrett | June 15, 1954 |

FOREIGN PATENTS

| | | |
|---|---|---|
| 13,677 | Great Britain | of 1915 |
| 370,319 | France | Dec. 17, 1906 |
| 438,430 | Great Britain | Nov. 18, 1935 |
| 606,506 | Great Britain | Aug. 16, 1948 |
| 690,836 | France | June 30, 1930 |
| 745,578 | Great Britain | Feb. 29, 1956 |